United States Patent [19]
Christofferson

[11] 3,730,965
[45] May 1, 1973

[54] EXPANSION JOINT FOR GAS-INSULATED TRANSMISSION LINE

[75] Inventor: James Christofferson, West Newbury, Mass.

[73] Assignee: High Voltage Power Corporation, Westboro, Mass.

[22] Filed: July 14, 1972

[21] Appl. No.: 272,083

[52] U.S. Cl. .................. 174/13, 174/86, 174/99 E
[51] Int. Cl. .......................................... H02g 15/24
[58] Field of Search ............... 174/12 R, 13, 21 CA, 174/86, 99 E; 339/9 E

[56] References Cited

UNITED STATES PATENTS

| | | |
|---|---|---|
| 3,479,444 | 11/1969 | Hus ............................. 174/13 UX |
| 3,548,071 | 12/1970 | Bahen, Jr. et al. ................ 174/13 |
| 3,573,342 | 4/1971 | Graybill et al. ................ 174/13 X |
| 3,585,270 | 6/1971 | Trump ............................ 174/13 |

*Primary Examiner*—Laramie E. Askin
*Attorney*—Russell & Nields

[57] ABSTRACT

An expansion joint for the central conductor of a compressed-gas-insulated transmission line permits the desired mutual longitudinal movement of adjacent central conductors by means of flexible connectors so arranged as to provide a negligible increase of diameter of the central conductive path while having sufficient length and flexing properties such that fatigue is reduced. The flexible connectors are a multiplicity of thin strips disposed in a circular path within a thin surface transverse to the axis of the transmission line.

4 Claims, 8 Drawing Figures

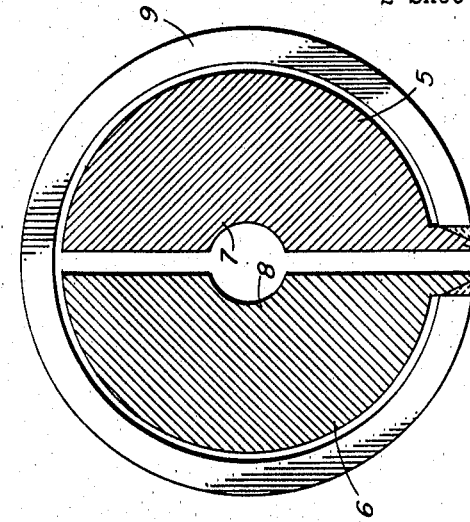
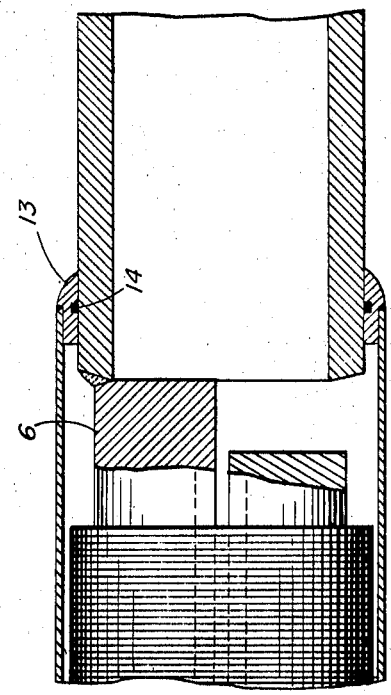
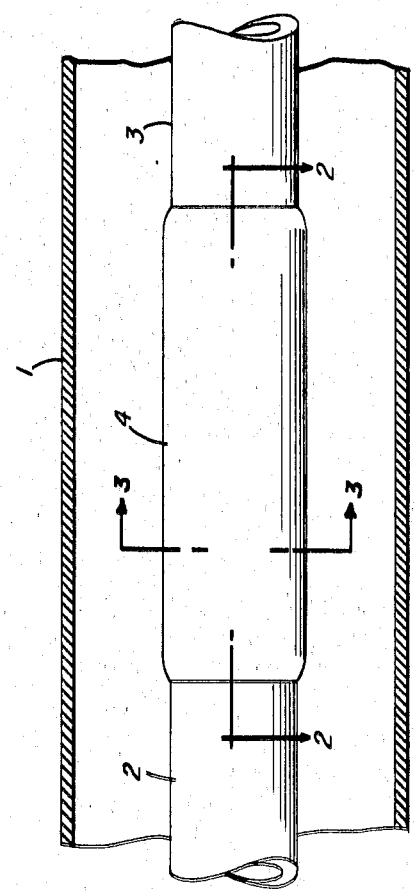
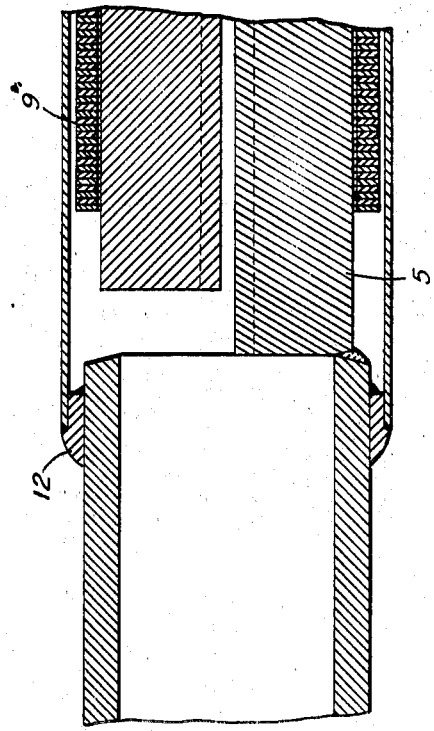

Patented May 1, 1973 3,730,965
2 Sheets-Sheet 2
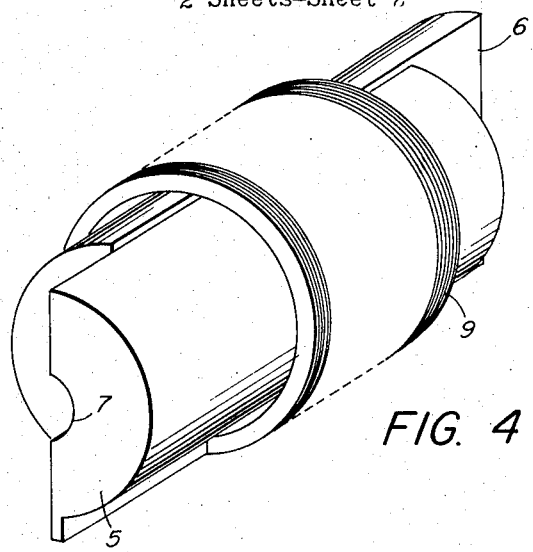
FIG. 4
FIG. 5
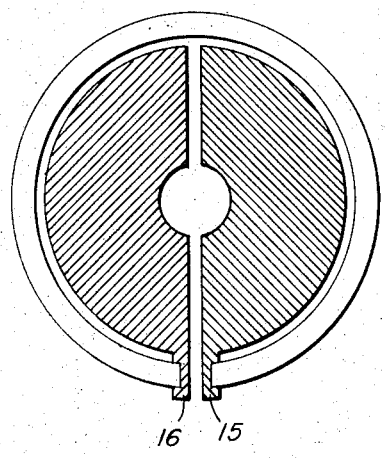
FIG. 6
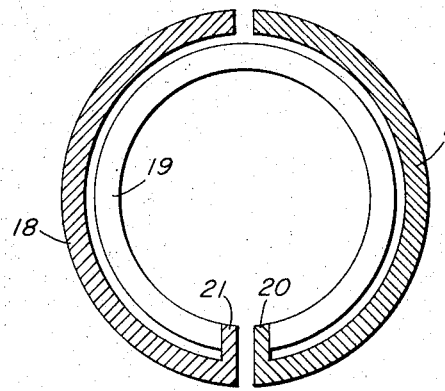
FIG. 7
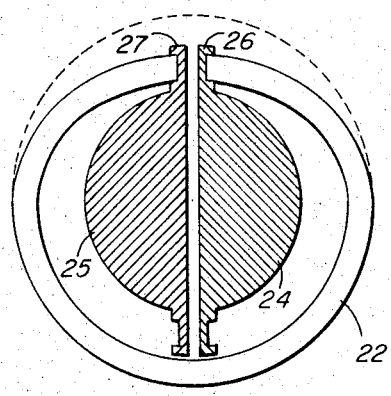
FIG. 8
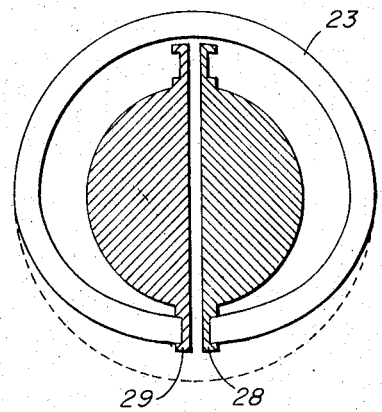

EXPANSION JOINT FOR GAS-INSULATED TRANSMISSION LINE

BACKGROUND OF THE INVENTION

It is well known that a significant trend exists toward the transmission and utilization of ever larger amounts of electric power. At the present time, the transmission of power to large urban population centers has conventionally been by means of overhead lines from the point of generation to the point of distribution and usage. The few exceptions to this reside in the furnishing of power to downtown areas and in some of the newer and more exclusive suburban areas. In the former instance, underground power transmission has been a necessity as a result of crowded conditions, limited easements and right-of-ways, and safety factors where higher voltage and power loads have been required. In the latter instance, however, the driving force behind underground cables has been more due to aesthetic continuity of the living area as opposed to technical and practical limitations as the public has been reluctant to accept the influence of high voltage overhead transmission lines. In addition, there are both technical and economic limitations to the underground transmission of small amounts of power by conventional high voltage oil-paper and solid dielectric cables.

The solid-insulated cable is typical of the underground cable now in use. This cable comprises an inner conductor having a solid insulation built up from spiral-wrapped paper and subjected to a vacuum-drying process followed by thorough impregnation with insulating oil or similar void-filling material. These solid insulated cables are used for voltages as high as 345 Kv. but are inefficient since they carry only a fraction of the current capability of an overhead line operating at this voltage and at far higher cost per unit power transmitted.

For more than a score of years, consideration has been given to compressed gas-insulated transmission lines as an alternative to overhead head lines for both preserving the beauty of the countryside, as well as providing increased power transmission at comparable costs. Moreover, the technical aspects of the gas-insulated transmission line offers unique advantages for present and future needs of underground electric power transmission. For example, in contrast to oil-paper cable systems, a rigid gas-insulated transmission line offers:

1. Substantially reduced charging current and increased permissible length of line without relative compensation due to the low dielectric constant of gas which is essentially unity even at high pressures. Moreover, the electrode geometry of rigid concentric conductors can be made more favorable than in the case of flexible oil-paper cable. This can result in overall reduction in the comparative capacitance by a factor of about four.

2. Low dielectric loss and lower conductor resistance especially when the compressed gas is operated below the ionization level. Thus, the dielectric loss under these conditions, even at high gradients, is of negligible amount. The use of a rigid high voltage conductor permits and encourages the use of larger cross sections with corresponding gains in current and heat transfer capabilities and with greater choice of conductor materials. As a result, power capabilities surpassing those of present overhead lines of the same voltage are possible.

3. Improved thermal performance arising from the superior heat transfer properties of compressed gas. This is a result of the nondegrading dielectric properties of gas with temperature, the permissible use of temperature insensitive spacer materials and the lower thermal resistance to earth of the larger external pipe.

4. Voltage insulating properties which can be applied to all present voltage levels and which can clearly be extended to 1000 Kv. − 10,000 megawatt capacities.

However, previous attempts to economically provide such lines have been frustrated by structural problems related to manufacture of the line, difficulties in maintaining the proper radial position of the inner conductor within the outer conductor or gas container, and in joining of adjacent transmission line sections to provide proper rigidity and exclude contamination. In addition, previous gas-insulated transmission lines have not been able to compensate properly for thermal expensation of the central conductor when under heavy load and problems have arisen in attempts to assure gastight seals between connecting transmission line sections that will resist leakage even when the insulating gas is pressurized. Then, too, electrical problems have arisen relative to providing a sufficient electrical connection between the central conductors, maintaining a predetermined gradient in the insulating space between the conductors, and minimizing sparkover where supports are required in the line. It is the failure of the prior art to cope with these and other factors that has delayed the commercial realization and embodiment of gas-insulated transmission line.

Various proposals for the construction of gas-insulated transmission lines are set forth in U.S. Pat. No. 3,585,270 to Trump, from which it will be seen that one of the major problems associated with such lines is the provision of suitable means to compensate for the thermal expansion and contraction of the central conductor.

Generally, gas-insulated transmission lines will be constructed in sections, so that thermal expansion and contraction of the central conductor can be accommodated by a suitable expansion joint between adjacent sections of the central conductor. Several such expansion joints are shown in said patent to Trump. An expansion joint which is manufactured at room temperature may, in operation under full load in summer, reach a temperature of 140°F and, if installed in arctic regions, reach a temperature of −40°F in winter. A representative expansion joint might be required to expand by one-half inch from its factory condition and also to contract by one-half inch from its factory condition, and the cycle of expansion/contraction might be 300–500 cycles per year. Thus, fatigue properties of an expansion joint are significant. In an expansion joint of the type shown in FIG. 2 of said patent to Trump, comprising a sandwiched array of bands arranged axially with a loop or bulge extending transversely outward, the flexing is concentrated at the center of the loop.

An important requirement of the expansion joint is that its effective diameter be small. The expansion joint must include enough conducting material to carry the current and the added requirement of mechanical movement results in some increase in diameter over that of the central conductor, as shown in FIG. 2 of said patent to Trump. Expansion joints designed to eliminate such increased diameter may encounter other problems: the expansion joint shown in FIG. 10 can eliminate such increased diameter, but only by increasing flexure concentration at the center of the connecting bands. Any increase in diameter at the expansion joint reduces the voltage which can be carried by the transmission line, unless means are provided to increase the diameter of the outer sheath around the expansion joint, which in turn may introduce undesirable complexities.

SUMMARY OF THE INVENTION

The expansion joint comprehended by the invention preserves low diameter increase while avoiding flex concentration by providing a multiplicity of thin apertured discs each having a radial gap, said discs being arranged parallel to each other and perpendicular to the axis of the transmission line so that opposed edges at the gap may move axially with respect to one another with negligible movement in the transverse dimension. Each apertured disc forms a split ring around which flexing is uniformly spread, and flexing introduces negligible change in the diameter of the ring.

While particularly useful in gas-insulated transmission lines, the invention is not limited thereto, but includes expansion joints for electrical equipment having similar expansion problems, such as isolated phase bus bars.

BRIEF DESCRIPTION OF THE DRAWINGS

FIG. 1 is a side view of a gas-insulated transmission line having an expansion joint constructed according to the invention, the outer sheath being broken away to show the central conductor;

FIG. 2 is an enlarged view, partly in longitudinal central section along the line 2—2, of the expansion joint of FIG. 1;

FIG. 3 is a section along the line 3—3 of FIG. 1;

FIG. 4 is a perspective view, somewhat simplified, of the expansion joint of FIG. 1, showing relative movement of the components of the expansion joint;

FIG. 5 is a view, similar to that of FIG. 3, showing an alternative embodiment of the invention;

FIG. 6 is a view, similar to that of FIG. 3, showing another alternative embodiment of the invention; and FIGS. 7 and 8 are views, similar to that of FIG. 3, showing still another alternative embodiment of the invention.

DETAILED DESCRIPTION OF THE INVENTION

Referring to the drawings, and first to FIG. 1 thereof, therein is shown a compressed-gas insulated transmission line of the general type shown in U.S. Pat. No. 3,585,270 to Trump. A central conductor is supported within an outer sheath 1 by suitable insulating supports (not shown), and the space within the sheath 1 is filled with an insulating gas under pressure. The portion of the central conductor shown in FIG. 1 comprises two central conductor sections 2, 3 joined by an expansion joint. As shown in FIG. 1, the entire expansion joint of the present invention is enclosed within an outer shield or sleeve 4 whose outer diameter is only very slightly greater than the outer diameter of the central conductor 2, 3 so that it is not necessary to provide any alternation in the external sheath 1 in the vicinity of the expansion joint.

The expansion joint of the invention is shown in greater detail in FIGS. 2–4. Referring now to FIGS. 2–4, each central conductor 2, 3 generally will comprise a tubular member, since under normal conditions of transmission of electrical power the skin effect limits the useful conductor to a region near the outer surface thereof. In a representative transmission line useful for voltages of around 235 kilovolts and extending up to 345 kilovolts the central conductor might have an outer diameter of four inches and a wall thickness of one-half inch. In accordance with the invention, the end of each central conductor 2, 3 of the pair to be joined has affixed thereto a mating section 5, 6 which in the embodiment of the invention shown in FIGS. 2–4 comprises a generally solid semi-cylindrical member, the mating section 5 of one member 2 of the pair of conductors 2, 3 cooperating with the mating section 6 of the other central conductor 3 of the pair 2, 3 so as to form a generally cylindrical region within which the semi-cylindrical mating sections 5, 6 are capable of longitudinal movement with respect to one another (see FIG. 4). Each mating section 5, 6 may have an outer diameter of 3 ½ inches. The mutually adjacent ends of the central conductor and mating sections are suitably chamfered and then welded together (FIG. 2). Each of the mating sections 5, 6 may be provided with a semi-cylindrical depression 7, 8 in the flat face thereof in order that the pair of mating sections may be mounted on a mandrel for alignment thereof during affixation of the split rings as hereinafter described.

The expansion joint itself may conveniently be assembled prior to welding to the central conductors. In accordance with the invention the mating sections 5, 6 are connected to one another by means of a series of split rings 9 each lying in a plane transverse to the axis of the transmission line. Each ring 9 is relatively thin in the axial dimension so that the ends of any ring may move axially with respect to one another with a resultant flexing of the ring along its entire length and not concentrated at any particular region thereof. Depending upon the axial thickness of each ring, a suitable number of rings are provided in order to enable the family of rings to carry the necessary current passing from one mating section to the other. For example, if the axial thickness of each ring is one-sixteenth of an inch, 275 rings may be employed. Since the rings are to wrap around the mating sections in the embodiment shown in FIGS. 2–4, the inner diameter of each ring 9 must be greater than the outer diameter of the mating sections 5, 6 and may for example be 3 ⅝ inches. The outer diameter of the rings 9 is desirably kept as small as possible in order to maintain proper insulation in the transmission line without the need for changes in the diameter of the outer sheath 1 around the expansion joint. A suitable outer diameter for the rings shown in the embodiment of FIGS. 2–4 might be 4 ¼ inches. Since it is generally desirable to avoid sliding contact between the components of the transmission line (because of resultant creation of particles of aluminum due to rubbing action) one preferably provides a space such as 0.010 of an inch between adjacent rings 9.

The split rings 9 may be affixed to the mating sections 5, 6 in any of a variety of ways and for this purpose it may be desirable to provide a suitable tab 10, 11 on the mating sections 5, 6. In the embodiment shown in FIGS. 2–4 each mating section 5, 6 may, for example, be extruded aluminum having a cross section shown in FIG. 3 wherein a tab 10, 11 is provided having a taper for the purpose of providing space for a weldment between one end of the split ring and the mating section. Other possible connections such as dip-brazing will be described hereinafter.

Once the split rings 9 have been welded or otherwise affixed to the mating sections 5, 6, the expansion joint is ready for connection between the central conductors 2, 3. As shown in FIG. 4 the rings are affixed to each mating section extending from one end thereof down to some distance from the other end thereof, and the exposed region of one mating section is at the opposite end from the exposed region of the other mating section. In the representative example under discussion the rings themselves together with the spaces between them might occupy a length of 20 inches with a 2 inch length of exposed mating section on either side of this.

In assembling the expansion joint to the central conductors a ring element 12 having a rounded side and a notched side is slipped over the end of one 2 of the conductors and the notched side is welded to the central conductor 2 at, for example, one-half inch from the end of the central conductor 2, the ring element 12 itself having an axial length of about 1 inch. The expansion joint may then be welded to that end of that central conductor 2. A shield 4 which may comprise a 26-inch long sleeve of aluminum having a thickness of one-sixteenth inch is then slipped over the expansion joint and fitted into the notch of the ring element 12 and then welded thereto on the outside, thereby covering and electrically shielding the weld previously made between the ring element 12 and the central conductor 2 as well as the weld between the central conductor 2 and the expansion joint. The function of this sleeve is electrostatic shielding and therefore it may be thin. It may conveniently have a diameter of 4 ½ inches which is a very small increase over the 4 inch outer diameter of the central conductor 2 itself. This sleeve may fit fairly snugly over the rings 9, and with the dimensions given the outer diameter of 4 ¼ inches of the rings will fit with room to spare within the inner diameter of 4 ⅜ inches of the sleeve 4.

The other central conductor 3 may be welded to the expansion joint before the sleeve 4 has been slipped over the joint. There is welded to the sleeve 4 a second ring element 13 identical to the first except that in the inner periphery thereof a groove is provided adapted to receive a Teflon O-ring 14. This second ring element 13 slides over the second central conductor 3 and the Teflon O-ring 14 provides a bearing surface permitting sliding movement between the second conductor 3 and the grooved ring element 13.

In the embodiment shown in FIG. 5 the mating sections 5, 6 are provided with tabs 15, 16 which have a slot adapted to receive the ends of the split rings 9. After mechanical assembly of all the rings 9 on the mating sections 5, 6 the entire assembly may be dip-brazed in one operation.

In the embodiment of FIG. 6 the mating sections 17, 18 have enlarged semi-cylindrical depressions so as to provide a cylindrical space between the mating sections 17, 18 adapted to receive split rings 19 of relatively small outside diameter. The ends of the rings 19 are affixed to tabs 20, 21 extending inwardly from the respective mating sections 17, 18.

In the embodiment of FIGS. 7 and 8, FIG. 8 is a cross-sectional view parallel to that of FIG. 7, but shows split ring 23 which is adjacent to ring 22 of FIG. 7. Ring 22 is attached at one end to mating section 24 at the upper tab 26, then substantially encircles the perimeter of mating sections 24 and 25 and is attached at the other end to the upper tab 27 of mating section 25. The connections 28 and 29, respectively, are similar to the above-described connections 26 and 27.

The manner in which successive connective members of split rings are attached to the mating sections alternates between that of FIG. 7 and that of FIG. 8. Thus, respecting the longitudinal axis of the central conductors, the direction of current flow is clockwise in one ring and counter-clockwise in the next. In this manner, any magnetic fields induced by successive rings tend to cancel each other, and adverse inductive effects are minimized.

Having thus described the principles of the invention together with illustrative embodiments thereof, it is to be understood that although specific terms are employed they are used in a generic and descriptive terms and not for purposes of limitation, the scope of the invention being set forth in the following claims.

I claim:

1. An expansion joint for high-voltage electric cables, comprising:
   a first cable conductor terminating in a first mating section,
   a second cable conductor terminating in a second mating section,
   said mating sections juxtaposed in overlapping relationship,
   a plurality of thin flexible, conductive connecting members, each said member attached to said first mating section and to each said second mating section, the portion of each said member between said attachments lying in a thin flat surface perpendicular to the axis of said mating sections, whereby said connecting members flex under mutual axial movement of said cable conductors while resisting any non-axial mutual movement thereof.

2. The expansion joint of claim 1 wherein each said connecting member is of the shape of a split ring, one end of said split ring attached to said first mating section, said split ring extending therefrom and substantially encircling said juxtaposed mating sections, and the other end of said split ring attached to said second mating section.

3. The expansion joint of claim 2 wherein successive connecting members substantially encircle said juxtaposed mating sections from said first mating section to said second mating section in opposite directions.

4. An expansion joint for a gas-insulated transmission line comprising, in combination with a first conductor and a second conductor axially spaced and forming an elongated cylinder at high potential having a gap, a first mating section affixed to said first conductor, a second mating section affixed to said second conductor, said mating sections mutually overlapping, and a multiplicity of conductive members joining said mating sections, each such member being thin in the axial direction and occupying a region close to the periphery of the high-potential cylinder defined by said first and second conductors.

* * * * *